Figure 1:
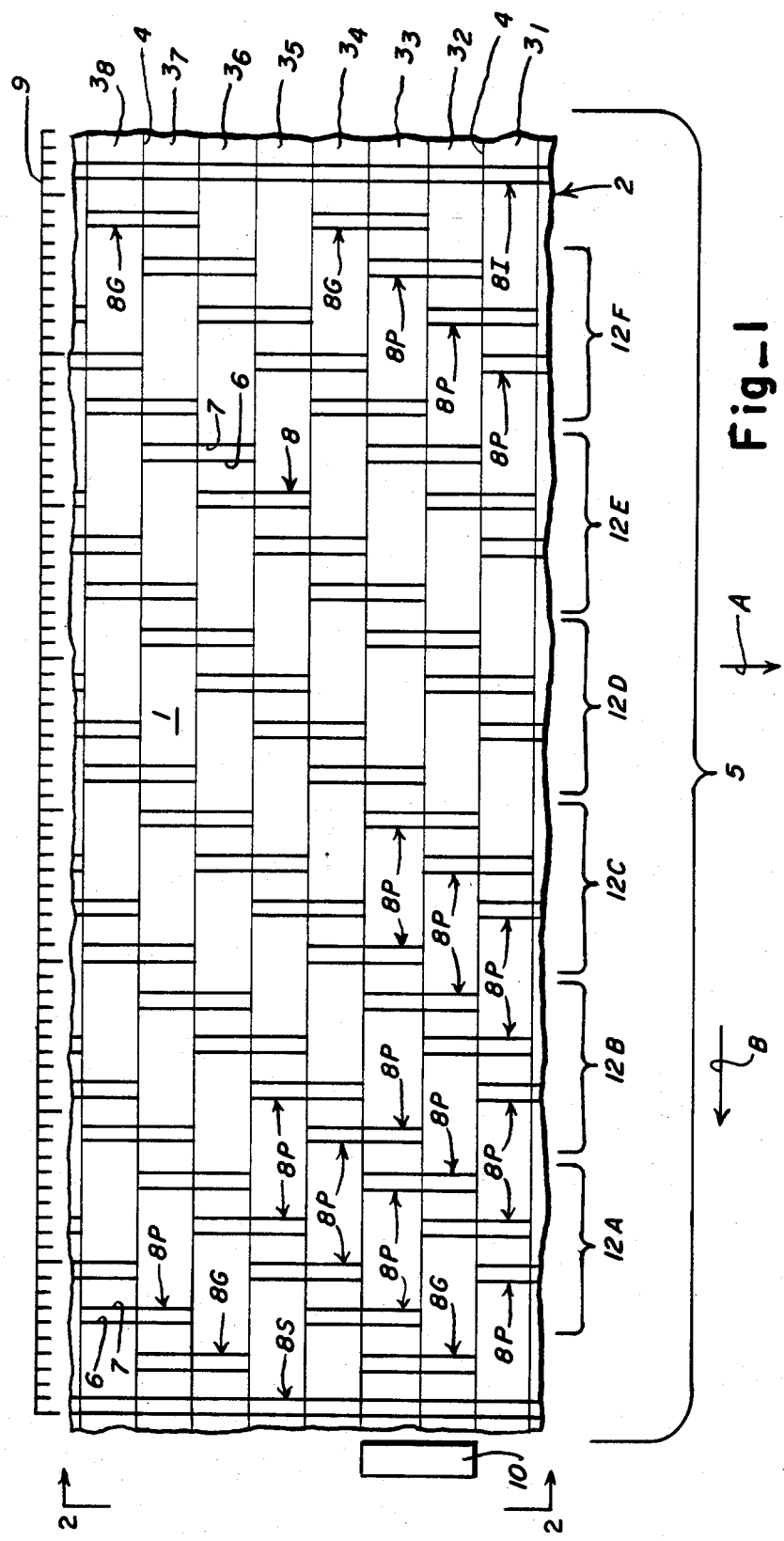

United States Patent [19]

Fultz

[11] Patent Number: 4,602,304

[45] Date of Patent: Jul. 22, 1986

[54] SERVO PATTERN FOR DEDICATED SURFACE TRACK FOLLOWING SERVO SYSTEMS

[75] Inventor: Jack Fultz, Thousand Oaks, Calif.

[73] Assignee: Pertec Peripherals Corporation, Chatsworth, Calif.

[21] Appl. No.: 748,745

[22] Filed: Jun. 25, 1985

[51] Int. Cl.$^4$ ............................................. G11B 5/55
[52] U.S. Cl. ........................................ 360/77; 360/78
[58] Field of Search .................................... 360/77, 78

[56] References Cited

U.S. PATENT DOCUMENTS 4,499,511 2/1985 Sugaya ................................. 360/78

OTHER PUBLICATIONS

IBM Technical Disclosure Bulletin, vol. 20, No. 8, Jan. 1978, pp. 3243–3247, Sector Servo Method, Deremer et al.

IBM Technical Disclosure Bulletin, vol. 22, No. 12, May 1980, pp. 5436–5438, Quad-Burst Servo Pattern, Liu et al.

*Primary Examiner*—George G. Stellar
*Attorney, Agent, or Firm*—Joseph R. Spalla

[57] ABSTRACT

A disk for use in a dedicated surface track following servo system has a plurality of radially spaced circumferential tracks on which synchronizing, position, and track region identifying transition pairs are recorded together with guard transition pairs between the synchronizing and position transitions pairs and between the position and track region identifying transition pairs. The guard and position transition pairs each bridge two adjacent tracks and are separated radially and circumferentially from track to track in repetitive staircase fashion.

8 Claims, 2 Drawing Figures

U.S. Patent

Jul. 22, 1986

4,602,304

SERVO PATTERN FOR DEDICATED SURFACE TRACK FOLLOWING SERVO SYSTEMS

This invention relates to servo patterns for reducing errors in dedicated surface track following servo systems; more particularly, it relates to servo patterns including synchronizing, position, and track region identifying information; and specifically it relates to such servo patterns including guard information between synchronizing and repetitive position information and between repetitive position and track region identifying information which serve to reduce amplitude abberations causing position errors due to proximity of synchronizing and track region identifying information to position information.

BACKGROUND OF THE INVENTION

It is known in the prior art to utilize a storage surface within a disk drive device to form a position transducing arrangement for purposes of positioning the data storage heads. The most common method is to provide a dedicated storage surface whereon a servo pattern is magnetically prerecorded. A dedicated magnetic playback or servo head reads the servo pattern and the signal obtained is demodulated to produce a position signal which is applied to a servo system to control an actuator that positions the heads. The servo system is referred to as a track following servo because it essentially follows a track defined by the pre-recorded servo pattern as it positions the servo head on the basis of the demodulated position signal.

In order to provide for a high data storage density in disk drive type devices, the distance between adjacent data tracks must be made very small. This requires that the total positioning error be correspondingly small, such as tens of microniches or less. Therefore, it becomes necessary to reduce the causes of position errors. Since there are usually a large number of items that contribute to position errors and since some of them cannot be easily reduced, it is desirable to reduce as many errors as possible to the extent possible. Among the causes of positioning error is the servo pattern itself.

Position errors caused by the servo pattern itself can be reduced as shown in U.S. Pat. Nos. 3,534,344 and 3,691,543. In U.S. Pat. No. 3,534,344 position information is conveyed by transitions of opposite polarity at circumferentially spaced positions in adjacent servo tracks. In U.S. Pat. No. 3,691,543 position information is conveyed by transitions of like polarity at circumferentially spaced positions in adjacent tracks.

To improve the signal noise ratio, particularly as servo track widths were narrowed to increase the number of tracks per inch, the prior art employed servo heads essentially twice the width of a servo track. However, the use of the servo heads twice the width of the servo track in combination with transitions of like polarity in adjacent servo tracks as in the forementioned U.S. Pat. No. 3,691,543 presented problems where it was necessary to include in the servo pattern dedicated synchronizing pulses for purposes of synchronizing the demodulation process, and track region identifying information and index information.

As the output signal if the servo head is influenced by magnetic transitions proximate one another, peak shifting and reductions in amplitude of the output signal become more pronounced as the transitions are brought or crowded closer together to improve sampling rates. Where the servo pattern is uniform, as when it consists of only position information, the derived position information at the output of the servo head would not have any periodic amplitude abberations due to unequal pulse crowding effects. However, with the introduction of synchronizing and track region identifying information, the pattern is no longer homogenous and the derived position information suffers periodic amplitude abberations due to the pulse crowding influence of the synchronizing and track region identifying information on adjacent position information. These abberations contribute to position errors.

In accordance with the invention, there are included in a servo pattern having synchronizing and track region identifying information, guard transitions between the sychronizing and repetitive position information and between the repetitive position information and track region identifying information which provides pattern uniformity with respect to the position information in that the pulse crowding effect of the guard transitions on position information is the same as the pulse crowding effect between position information, thereby avoiding periodic amplitude abberations in derived position information.

An object of the invention is to provide, in a servo pattern which includes synchronizing, position and track region identifying information, means for avoiding periodic amplitude abberations in the derived position information.

Another object of the invention is in the provision of guard transitions between position information and synchronizing and track region identification included in a servo pattern.

Figure 2:
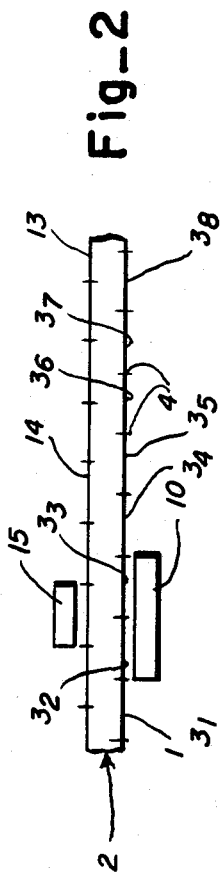

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

FIG. 1 is a surface view of a portion of a dedicated surface of a disk showing a servo pattern recorded thereon in accordance with the invention and a double track width servo head for reading out the servo pattern; and FIG. 2 is a sectional view taken along lines 2—2 of FIG. 1 showing a disk having a dedicated servo surface and a magnetic data surface.

Referring now to the drawing wherein like reference numerals designate like or corresponding parts throughout the several views and wherein a preferred embodiment is disclosed, there is shown in FIG. 1 a portion of a dedicated surface 2 of a disk generally designated by reference numeral 2 having, with reference to the center of the disk to which direction arrow A points, a plurality of radially spaced circumferential servo tracks, of which only eight, $3_1$–$3_8$ are depicted having abutting circumferential boundries 4. The portion of disk 2 shown includes only a single servo cell 5 of a series of servo cells. Recorded on the surface 1 within a servo cell 5 is a servo pattern comprising closely spaced magnetic transitions 6 and 7 constituting a transition pair generally designated by reference numeral 8 which are spaced in a circumferential direction by a distance which is twice the distance between transitions of a pair 8, as indicated with reference to scale 9, which is not part of the pattern, having equidistant marks. It is to be here understood that the relative spacing between various transitions 6 and 7 of a pair 8 and between pairs 8 is for purpose of illustration and that actual implementation could utilize different relative spacing.

The servo pattern is read by rotating the disk 2 in the direction of arrow B relative to a servo head 10 having read a width essentially twice the width of servo track 3. The resulting signal at the output of the head 10 is demodulated such that two position signals having full quadrature relationship are derived for application to a servo head positioning servo loop including a head actuator to correct position error as will be understood in the art.

The servo pattern recorded in the surface 1 of the disk 2 in each servo cell 5 comprises, in circumferential turn, a transition pair 8S in each track 3 dedicated to provide synchronizing information, transition pairs 8G in selected tracks to provide leading guard information, as will hereinafter appear, and a plurality of servo subcells 12A–12F each embracing four transitions sites and each containing an equal number of transition pairs 8P arranged to provide full quadrature position information. Following subcell 12F the pattern includes additional trailing guard transition pairs 8G in selected tracks, and a transition pair 8I in each track 3 to provide track region identifying information.

The transition pair 8I is selectively omitted (not shown) in certain regions of the pattern to convey region identifying information or index information, the latter a once or twice per revolution event.

As shown in FIG. 1, it is seen that guard transition pairs 8G and the position transition pairs 8P each radially extend over two tracks 2, and are separated in the radial direction by two tracks. Also, circumferentially adjacent transitions 8 in the direction of disk rotation B overlap one track. The result is that the guard position transition pairs 8G and 8P are radially and circumferentially spaced from track to track in repeating staircase fashion.

It will be appreciated that due to the interposition of the leading guard transition pairs 8G between the sync transition pairs 8S and the position transition pairs 8P in subcell 12A, the pulse crowding or amplitude reducing effect of the guard transition pair will be equivilent to the pulse crowding effect of transition pairs in abutting subcells 12, and that due to the interposition of the trailing guard transition 8G, the pulse crowding effect on the position transition pairs 8P in abutting subcell 12F is also the same as that between transition pairs in abutting subcells 12. Thus, the interposition of the leading and trailing guard transition pairs 8G guards the position transition pairs 8P from and significantly reduces the influence of the synchronizing and track region indentifying transition pairs 8S and 8I, respectively, on the position information which would cause periodic amplitude abberations and result in position errors. As the leading and trailing guard transitions 8G are not demodulated, the result of the use of guard transitions 8G is that magnetic uniformity of the pattern is not disrupted and position information having a homogenous uniform amplitude characteristic is provided.

As will be appreciated to those skilled in the art, the synchronizing information is employed with a phase locked loop to time the demodulation process.

While the transition pair 8I in one servo cell 5 would, to provide maximum pattern density, be spaced from the transition pair 8S in the next servo cell (not shown) by the same distance utilized between other transition pairs 8 in the pattern, other spacing between transition pairs 8I and the transition pair 8S in the next servo cell could be utilized. If the spacing between transition pairs 8I and transition pairs is in the next servo cell 5 is made relatively large, then this imparts a unique property to the pair 8S which aids in its detection. For the situation where a relatively large space between transition pairs 8I and following pairs 8S is utilized, then the leading guard transition pair and the trailing guard transition pair reduce the effect that such a large distance would otherwise have in disrupting the magnetic uniformity of the position transition pairs 8P.

With reference to FIG. 2, the servo pattern described with reference to FIG. 1 is shown on the lower surface 1 of a disk 2 whose upper surface 13 contains data tracks 14 on which magnetic data may be recorded or read by a data head 15. As shown in FIG. 2, the boundries 4 of the servo tracks are opposite the centerline of the data tracks 14. The invention has utility not only in the magnetic recording disk drives as shown in FIG. 2, but also in magneto-optical and electro-optical disk drives wherein a dedicated servo surface pattern is utilized.

The invention claimed is:

1. For use in dedicated surface track following servo system, a disk having on one surface a plurality of radially spaced circumferential servo tracks on which magnetic patterns are pre-recorded, and a positionable magnetic pattern sensing transducer having a width twice the width of a servo track for simultaneously sensing the magnetic patterns in two adjacent servo tracks whereby position errors may be generated when said transducer is not centered on the boundry between selected adjacent servo tracks, each of said servo tracks comprising a series of servo cells in each of which is recorded a pattern comprising in turn circumferentially spaced synchronizing information, repetitive servo position information, and track region indentifying information, and wherein between said synchronizing and said servo position information, and between said servo position and track region identifying information, guard information is recorded in selected servo tracks, to avoid disruption of pattern uniformity.

2. For use in a track following servo system as recited in claim 1, said recorded information comprising magnetic transition pairs, and said synchronizing pairs extending radially over all tracks.

3. For use in a track following servo system as recited in claim 2, said servo cells each comprising a plurality of subcells containing only repetitive servo position transition pairs.

4. For use in a track following servo system as recited in claim 3, said servo position transition pairs in a subcell extending over two servo tracks and being radially separated by two servo tracks.

5. For use in a track following servo systems as recited in claim 4, said guard transition pairs extending radially over two servo tracks and being radially separated by two tracks.

6. For use in a track following servo system as recited in claim 5, said guard and servo position pairs occupying sites which are radially and circumferentially spaced from track to track in repetitive staircase fashion.

7. For use in a track following servo system as recited in claim 4, said transducer output being characterized by positive and a negative going signals having a uniform characteristic whose peak amplitudes are a function of the spacing between transitions of a pair and between transition pairs.

8. For use in a dedicated surface track following servo system as recited in claim 1, said disk having another surface parallel to the servo track surface containing closely spaced circumferential data tracks on which data may be recorded and read, said data track centerlines being opposite the boundries between adjacent servo tracks.

* * * * *